July 13, 1965 R. C. BOUGHTON 3,194,592
COUPLING NUT ASSEMBLY
Filed Aug. 16, 1962
FIG. 1
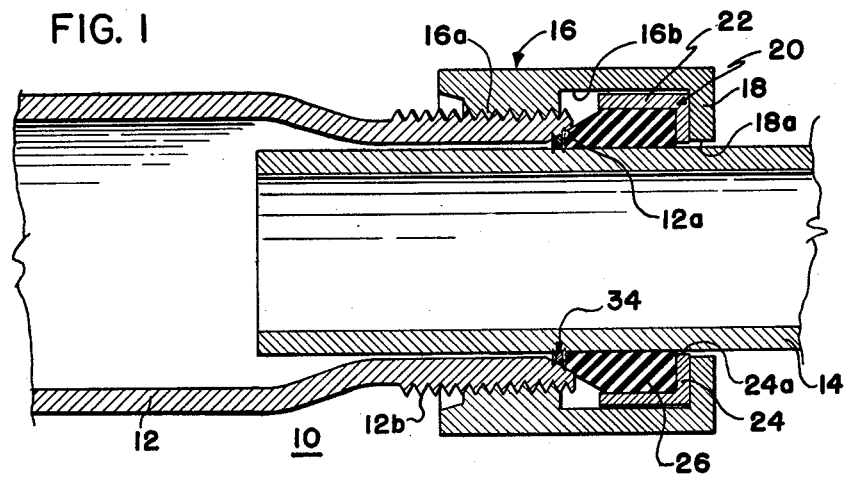
FIG. 2
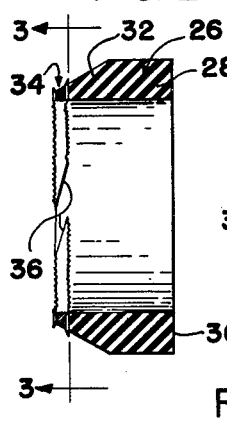
FIG. 3
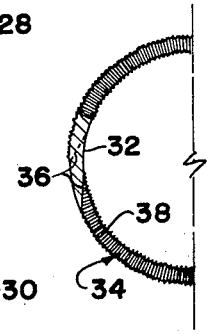
FIG. 6   FIG. 5
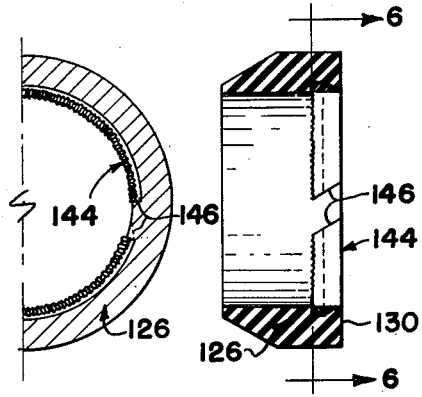
FIG. 4
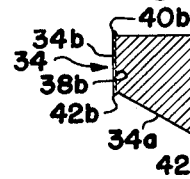
FIG. 8
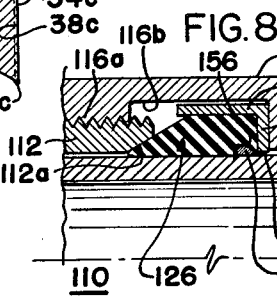
FIG. 7
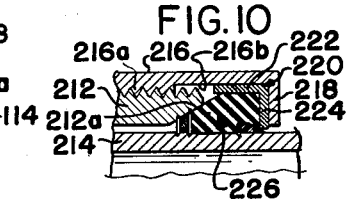
FIG. 10
FIG. 9
INVENTOR.
ROGER C. BOUGHTON
BY Mason, Kolehmainen,
Rathburn & Wyss.
ATTORNEYS United States Patent Office 3,194,592
Patented July 13, 1965

3,194,592
COUPLING NUT ASSEMBLY
Roger C. Boughton, Western Springs, Ill., assignor, by mesne assignments, to Pittsburgh Pipe and Coupling Company, Allison Park, Pa., a corporation of Pennsylvania
Filed Aug. 16, 1962, Ser. No. 217,493
2 Claims. (Cl. 285—342)

The present invention relates to coupling nut assemblies for pipes and the like and is more particularly concerned with coupling nut assemblies of the same general type as that described in my copending application, Serial No. 759,713, filed September 8, 1958, now Patent No. 3,074,747, of which this application is a continuation in part.

The present invention is an improvement over my previous U.S. Patent No. 2,816,472, for a Gasket Carrying Coupling Nut, dated December 17, 1957, and has for a primary object the provision of a new and improved coupling nut assembly having means for mechanically coupling an inner pipe to a sleeve assembly in a manner to prevent water or other foreign material from entering or leaving the sleeve or pipe, as well as to provide a good electrical connection therebetween which connection is not subject to corrosion or other deterioration from external sources.

Another object of the present invention is to provide a new and improved coupling nut assembly which provides a mechanical connection between an inner pipe and a coupling sleeve in which the connecting parts are tightly secured in relation to each other so that they cannot be inadvertently loosened and the inner pipe cannot be slipped out of or rotated relative to the sleeve.

A further object of the present invention is to provide a new and improved coupling nut assembly which is water tight and not subject to leakage or corrosion from the exterior.

Still another object of the present invention is to provide a new and improved coupling nut assembly of the type described wherein there is provided a continuous annular electrical connection between the inner pipe and sleeve which connection has a high current carrying capacity and is sealed from the exterior so that the connection will not become faulty and will not have large non-conducting areas causing cathodic deterioration because of slight differences in electrical potential or localized hot spots.

A still further object of the present invention is to provide a new and improved electric sealing gasket for a coupling nut assembly of the type described wherein the gasket is provided with an integrally molded metallic wedge ring which serves to provide a continuous annular electrical connection between the inner pipe and the sleeve and also provides means for preventing extension of the gasket which would destroy it or so deform it that replacement might become necessary.

The invention has for another object the provision of a new and improved sealing gasket for a coupling nut assembly as described in the preceding paragraph which is simple in construction, economical to produce, long in life, and one which can easily be installed or removed when desired.

The invention has for a further object the provision of a new and improved gasket for a coupling nut assembly which gasket includes an integrally molded locking ring having teeth thereon for biting into an adjacent metallic member of the coupling to form a firm, non-slipping mechanical connection.

The invention, both as to its organization and manner of operation, together with further objects and advantages will best be understood from the following detailed description and appended claims forming this specification when taken in conjunction with the drawings, wherein:

FIG. 1 is a fragmentary, longitudinal sectional view of a coupling nut assembly characterized by the features of the present invention;

FIG. 2 is an enlarged sectional view showing the composite gasket and wedge ring used in the assembly shown in FIG. 1;

FIG. 3 is a fragmentary, sectional view taken substantially along the line 3—3 of FIG. 2;

FIG. 4 is an enlarged, fragmentary sectional view of the wedge ring shown in FIG. 2;

FIG. 5 is a sectional view of another form of composite gasket and wedge ring constructed in accordance with the features of the present invention;

FIG. 6 is a fragmentary, sectional view taken along a line substantially corresponding to the line 6—6 of FIG. 5;

FIG. 7 is an enlarged, fragmentary sectional view of the wedge ring of FIG. 5;

FIG. 8 is a fragmentary, longitudinal sectional view of a coupling nut assembly utilizing the gasket and wedge ring of FIG. 5;

FIG. 9 is a sectional view of yet another form of composite gasket and wedge ring constructed in accordance with the features of the present invention; and FIG. 10 is a view similar to FIG. 8 but shows a coupling nut assembly utilizing the gasket and wedge ring construction of FIG. 9.

Briefly, the foregoing and other objects and advantages of the present invention are accomplished by the provision of a new and improved coupling nut assembly having a tubular sleeve adapted to telescopically engage the outer surface of an inner pipe which is to be coupled to the assembly. The sleeve is externally threaded adjacent its end and the end tapers inwardly to form a frusto-conically shaped wedging surface. A coupling nut having internal threads at one end thereof is threaded onto the sleeve and has a radially inwardly directed flange at the other end forming a central aperture accommodating the inner pipe. An enlarged annular recess is provided between the end flange of the nut and the threaded portion in order to house a gasket assembly. The gasket assembly comprises a cylindrical band having an open end facing the end of the sleeve and also having a radially inwardly directed flange at the other end abutting the end flange of the nut and having a central aperture dimensioned to receive the inner pipe. An annular elastic gasket is provided having a portion within the band with a radial end surface abutting the end flange of the band. The gasket also includes a frusto-conical surface extending outwardly from the open end of the band to engage the wedging surface of the sleeve when the nut is tightened onto the sleeve.

In one embodiment of the invention, there is provided at the outwardly extending end of the frusto-conical portion of the gasket, an annular, split, wedge ring of frusto-conical cross-section having a pair of generally radial faces with radial serrations thereon. The serrations on the ring form radially inwardly and outwardly directed burrs or teeth which are forced into biting engagement with the conical wedging surface of the sleeve and with the outer peripheral surface of the inner pipe when the gasket is axially compressed by tightening the nut on the sleeve. Thus, the wedge ring provides a good mechanical connection between the sleeve and the pipe to prevent the pipe from being moved axially with respect to the sleeve and also to prevent the gasket from being extruded between these parts. The ring also provides a good electrical connection between the pipe and the sleeve and this connection is sealed from the exterior so that it is not subject to corrosion. In this connection it should be recognized that the pipe sections in many modern installations carry high currents at low voltage and, as a result, there is a marked tendency for corrosion resulting from electrolysis. It is often desirable to isolate areas of pipe sections wherein the couplings between individual sections have very high conductivity in order to reduce these corrosion problems.

In another form of the invention where electrical contact between the pipe and sleeve is not an important factor, a split, annular wedge ring having a frusto-conical portion and a radial face is molded into the gasket adjacent the end abutting the end flange of the band. The radial face of this wedge ring is provided with radial serrations forming inwardly directed burrs or teeth and the frusto-conical portion is so arranged that as the nut is tightened onto the seleve, this portion wedges tightly between the aperture in the flange of the band and the outer surface of the inner pipe to prevent extrusion of the gasket therebetween. The teeth are forced into biting engagement with the pipe to prevent movement of the pipe relative to the sleeve.

In another embodiment both forms of wedge rings are molded into the gasket in order to achieve all of the advantages of each type.

In another form of the invention the gasket includes a locking ring housing radially inwardly extending teeth thereon for biting into the inner pipe. The gasket and the other elements making up the coupling are so constructed and arranged that any pull on the pipe in a direction tending to break the coupling causes an increase in the biting action of the locking ring, thus preventing the pipe from being pulled from the coupling sleeve.

Referring now to the drawings, there is illustrated in FIG. 1 a coupling nut assembly constructed in accordance with the present invention and indicated as a whole by the reference numeral 10. This assembly includes an enlarged sleeve 12 having a reduced diameter end portion with a diameter slightly larger than the outer diameter of an inner pipe 14 which is telescopically fitted into the end of the sleeve. The sleeve is dimensioned to fit all pipes within normal tolerance of a given nominal diameter regardless of small deviations in pipe size resulting from milling and cutting during manufacture of the pipe. Thus, the sleeve fits loosely around the pipe 14.

The end of the sleeve 12 is provided with an internally tapered frusto-conically shaped end wedging surface 12a and the sleeve is provided adjacent its end with external threads 12b for engagement with an internally threaded portion 16a adjacent the open end of a coupling nut 16. The other end of the coupling nut 16 is provided with a radially inwardly directed end flange 18 having a central aperture 18a of slightly larger diameter than the outer diameter of the pipe 14 to facilitate sliding the nut on the pipe or inserting the pipe into the nut. An enlarged annular recessed portion 16b is formed in the nut 16 between the threaded portion 16a and the end flange 18 in order to accommodate an annular gasket assembly 20.

The gasket assembly 20 includes a cylindrical band or gasket retainer 22 having an open end facing the end of the sleeve 12 and an outer diameter slightly less than the inner diameter of the recessed portion 16b of the nut in order that the band may rotate relative to the nut or remain stationary as the nut is tightened on the sleeve. The other end of the band 22 is provided with a radially inwardly directed flange 24 in which there is provided a central aperture 24a of slightly greater diameter than the outer diameter of the pipe 14 so that the gasket assembly may easily be slipped onto the pipe during assembly. The apertures 18a and 24a are large enough to accommodate all pipes within normal tolerance of the nominal diameter as was indicated above. The end flange 24 abuts the flange 18 of the nut 16 so that as the nut is tightened on the sleeve 12 the gasket assembly 20 is moved toward the end of the sleeve. Since the band 22 is smaller in diameter than the recessed portion 16b of the nut, the band 22 may remain stationary relative to the pipe and sleeve as the nut is turned.

In order to provide a seal between the sleeve 12 and the pipe 14, the assembly 20 further includes an annular elastic gasket 26, preferably of rubber, which is positioned around the pipe and is received in the open end of the band 22. The gasket 26 is provided with an annular cylindrical portion 28 having a radial end face 30 which abuts the end flange 24 of the band 22 and a frusto-conical portion 32 which extends outwardly from the open end of the band 22 to engage the wedging surface 12a of the sleeve when the nut is tightened. The internal diameter of the gasket 26 when it is not compressed is slightly larger than the outer diameter of the pipe 14, i.e. the maximum tolerance diameter to facilitate slipping the gasket assembly 20 thereon. The slope of the frusto-conical portion 32 of the gasket is approximately the same as the slope of the wedging surface 12a of the sleeve, so that as the nut 16 is tightened on the sleeve, the extending end of the portion 32 will wedge between the surface 12a and the outer periphery of the pipe 14 creating a relatively large area annular seal therebetween.

In order to provide good electrical contact between the pipe 14 and the sleeve 12 and also to prevent undesirable extrusion of the gasket between these elements as the nut is tightened, there is provided an annular, split, wedge ring 34 integrally molded into the leading edge of the frusto-conical portion 32 of the gasket. The wedge ring 34 is preferably constructed of some metallic substance such as brass which is a good conductor and is split as indicated at 36 in FIGS. 2 and 3, so that as the ring is wedged between the wedging surface 12a and the pipe 14, the ring will be compressed radially inward around its periphery to form a continuous ring.

The ring 34 has an internal diameter equal to that of the gasket 26 when they are in the non-compressed condition and has an outer conical surface 34a which has a slope substantially conforming to the slope of the frustro-conical section 32 of the gasket 26. The ring 34 is provided with a pair of substantially radial faces 34b and 34c which are provided with small radially extending serrations 38b and 38c forming ridges and grooves on these faces. When the serrations 38b and 38c are made in the radial faces of the wedge ring 34, small radially inwardly extending burrs or teeth 40b and 40c and small radially outwardly extending burrs or teeth 42b and 42c are formed in the process. These burrs or teeth are not removed from the ring but serve useful functions. As the wedge ring 34 is compressed and wedged between the wedging surface 12a of the sleeve 12 and the outer periphery of the pipe 14 when the gasket 22 is axially compressed during tightening of the nut 16 on the sleeve, the outwardly extending teeth 42b and 42c bite into the surface 12a and the inwardly extending teeth 40b and 40c bite into the external surface of the pipe 14. This biting action aids in preventing relative rotational or axial movement between the sleeve 12 and the pipe 14 and establishes good electrical contact between these two elements in continuous annular contact regions around the periphery of the pipe 14 thus preventing cathodic deterioration which could occur because of differences in potential between these elements. In addition, the inner surface of the wedge ring 34 is in intimate contact with the outer surface of the pipe and the surface 34a of the ring is similarly in intimate contact with the wedging surface 12a of the sleeve so that a high current carrying capacity electrical contact is established between the sleeve and pipe in a continuous annular band. The thickness of the teeth is such that they will penetrate any rust, scale, oil, slag, paint layers or the like in order to insure good electrical contact between the sleeve and the pipe around the entire periphery even in the presence of such foreign substances.

In addition to the holding forces between the sleeve 12 and pipe 14 because of the biting action of the teeth of the wedge ring 34, an additional holding force is provided by the inward compression of the gasket 26 around the periphery of the pipe. During axial compression of the gasket 34 caused by axial movement of the nut 16 and the band 22 relative to the sleeve 12 caused by tightening of the nut, the frustro-conical portion 32 is wedged between the wedge surface 12a and the pipe 14. Since the gasket 34 is made of elastic material it tends to flow under compression and tightly surrounds the pipe 14 providing a tight seal between the pipe and the sleeve to prevent any corrosive or foreign matter such as water from reaching the wedge ring 34 to corrode or deteriorate the electrical contact between the pipe, the sleeve and wedge ring. The band 22 with its end flange 24 serves to contain the gasket 26 during compression thereof and prevents outward radial expansion.

The wedge ring 34 prevents the leading edge of the frustro-conical portion 32 of the gasket 26 from being extruded between the wedging surface 12a and the pipe 14 to such an extent during compression of the gasket that the gasket would be permanently deformed or mutilated and, consequently, the gasket can be utilized over and over again with the same good results.

The gasket assembly 20 comprising the band 22, the gasket 26 and wedge ring 34 is a unitary assembly and, consequently, is easy to handle when being installed or when the coupling nut 16 is removed. The serrations 38c aid in bonding the ring 34 to the gasket during molding, thus greatly reducing the possibility that the ring will be torn off or loosened from the gasket during handling.

In utilizing the coupling nut assembly 10, the nut 16 containing the gasket assembly 20 may be slipped easily over the end of the pipe 14 which is then inserted into the sleeve 12 whereupon the nut is tightened. In the alternative, the nut 16 containing the gasket assembly 20 may first be loosely threaded onto the sleeve 12 following which the pipe 14 may be inserted therethrough into telescopic engagement with the sleeve before the nut 16 is further tightened. When the compression on the gasket 26 is released by unscrewing the nut 16, the gasket tends to expand and since the wedge ring 34 is integrally molded thereon, it also expands to facilitate removal of the gasket assembly 20 and the nut from the sleeve 12 and the pipe 14 for reuse.

Another embodiment of the gasket assembly of the present invention is illustrated in FIGS. 5 to 8 of the drawings and similar reference numerals, only one-hundred higher, will be used to illustrate and describe similar parts. The assembly as a whole is illustrated in FIG. 8 and is indicated by the number 110. The sleeve 112, inner pipe 114, coupling nut 116 and band 122 are respectively identical to the corresponding parts of the construction. An elastic sealing gasket 126, generally similar to the gasket 26, is provided and operates in a manner similar to the gasket 26 except that the wedge ring 34 is replaced with an annular split wedge ring 144 which is integrally molded into the gasket at the internal surface adjacent the radial face 130. The wedge ring 144 is split as indicated at 146 to permit radial contraction of the ring to form a continuous ring around the pipe 114 when the gasket 126 is compressed by tightening the nut 116.

A cross-sectional view of the ring 144 is illustrated in enlarged fashion in FIG. 7 from which it can be seen that the ring is comprised of a generally cylindrical annular portion 148 having an internal diameter equal to that of the gasket 26 when the ring and gasket are in the uncompressed condition. Again this diameter is slightly larger than the outer diameter of the pipe 114 to facilitate the slipping on of the gasket and ring over the pipe or the insertion of the pipe into the ring and gasket. The cylindrical portion 148 is provided with a radial annular face 150 on which there are provided radial serrations 152 which form ridges and grooves.

The serrations 152 do not extend radially outward to the periphery of the wedge ring, but terminate short thereof. When the serrations 152 are made on the radial face 150 of the wedge ring, generally radially inwardly extending burrs or teeth 154 are formed. These teeth 154 are not removed since they serve the useful purpose of biting into the outer surface of the pipe 114 when the ring 144 and gasket 126 are compressed by tightening the nut 116. The described biting action of the teeth 154 serves to secure the pipe tightly against movement relative to the assembly as well as providing a continuous band of engagement between the ring 144 and the pipe.

The ring 144 is also provided with a frustro-conically surfaced wedge portion 156 which, as shown in FIG. 8, is adopted to wedge between the inner periphery of the flange 124 of the band 122 and the outer surface of the pipe 114 when the nut 116 is tightened on the sleeve 112. This wedging action serves to further aid in securing the pipe 114 against movement relative to the assembly when the nut is tightened and also provides a continuous band of electrical contact between the outer surface of the pipe 114 and the flange 124 of the band 122. The ring 144 additionally prevents harmful extrusion of the gasket 126 between the internal periphery of the flange 124 and the outer surface of the pipe 114, thus greatly increasing the useful life of the gasket. The contact is between the ring 144, the pipe 114 and the flange 124, is exposed to moisture and, hence, the electrical contact may deteriorate after the gasket 126 has been in use for some time. However, even if this happens, the gasket assembly retains its other advantages. If the pipe 14 is pulled towards the right as viewed in FIG. 8 or if the sleeve is pulled towards the left in an attempt to break the coupling the applied force serves to compress the gasket 126 still further thus forcing the teeth 154 further into the pipe to increase the biting action and, hence, to strengthen the coupling.

FIGS. 9 and 10 illustrate in cross-section another embodiment of a sealing gasket 226 employing two wedge rings which gasket may be assembled in a coupling in the manner shown in FIG. 10. The wedge ring 234 is identical in construction and operation to the ring 34 previously described and the wedge ring 244 is identical in construction and operation to the ring 144 just described. Thus, the gasket 226 and its rings 234 and 244 provide a subassembly for use with the coupling nut assemblies to achieve the described advantages of both the embodiments shown in FIGS. 1 to 3 and that shown in FIGS. 4 to 8.

While there have been illustrated and described several embodiments of the present invention, it should be understood that many modifications will be apparent to those skilled in the art, and it is, therefore, intended in the appended claims to cover all such modifications falling within the true spirit and scope of the invention.

What is claimed as new and is desired to be secured by Letters Patent of the United States is:

1. A coupling assembly for use with a pipe comprising a sleeve telescoped around said pipe and including a wedging surface tapered inwardly from the end of said sleeve toward said pipe, coupling nut means having a wall portion spaced outwardly from and encircling said pipe to define an annular gasket receiving recess around said pipe, said coupling nut means including flange means extending inwardly from said wall portion toward said pipe defining an end wall of said recess opposite said wedging surface on said sleeve, means interconnecting said sleeve and coupling nut means for moving said flange means toward and away from said sleeve, elastomeric, annular gasket means around said pipe within said recess having a forward end disposed between said wedging surface and said pipe and a rear end facing said flange means, and wedge ring means bonded to said forward end of said gasket means, said wedge ring means having a first surface tapered on its outer circumference complementary to said wedging surface and a second surface having its inner periphery shaped to closely embrace said pipe, at least one radially extending face on said ring, a plurality of substantially radially extending serrations formed on said at least one radial face and terminating in radially extending teeth projecting outwardly from said first and second surfaces, a plurality of wirelike burrs extending from said radial teeth outwardly from said first and second surfaces of said wedge ring means gripping the sleeve and pipe in sealed relation.

2. A coupling assembly as defined in claim 1 including second wedge ring means adjacent the rear end of said gasket means, said second wedge ring means including a plurality of serrations on a radial face thereof forming a plurality of radially extending teeth and including a tapered rear end surface adapted to wedge said second ring inwardly around said pipe upon movement of said nut means toward said sleeve and a plurality of wirelike burrs formed on the teeth of said second wedge ring means extending inwardly thereof to grip said pipe in sealed relation.

References Cited by the Examiner
UNITED STATES PATENTS

| | | | |
|---|---|---|---|
| 2,451,354 | 10/48 | Ohls | 285—373 X |
| 2,585,453 | 2/52 | Gallagher et al. | 285—341 |
| 2,816,472 | 12/57 | Boughton | 285—348 X |
| 3,078,332 | 2/63 | Marx | 285—341 X |
| 3,118,682 | 1/64 | Fredd | 285—369 X |

CARL W. TOMLIN, *Primary Examiner.*